United States Patent
Park

(10) Patent No.: US 10,072,753 B2
(45) Date of Patent: Sep. 11, 2018

(54) METHOD AND SYSTEM FOR AUTOMATICALLY CONTROLLING SHIFT STAGE

(71) Applicant: Hyundai Motor Company, Seoul (KR)

(72) Inventor: Han Gil Park, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 519 days.

(21) Appl. No.: 14/880,642

(22) Filed: Oct. 12, 2015

(65) Prior Publication Data

US 2016/0327149 A1 Nov. 10, 2016

(30) Foreign Application Priority Data

May 7, 2015 (KR) .................. 10-2015-0063706

(51) Int. Cl.
*F16H 61/20* (2006.01)
*F16H 59/08* (2006.01)
*F16H 61/00* (2006.01)
*F16H 59/44* (2006.01)

(52) U.S. Cl.
CPC ....... *F16H 61/20* (2013.01); *F16H 2059/086* (2013.01); *F16H 2059/446* (2013.01); *F16H 2061/0087* (2013.01); *F16H 2061/207* (2013.01)

(58) Field of Classification Search
None
See application file for complete search history.

(56) References Cited

U.S. PATENT DOCUMENTS

| 5,301,572 | A | * | 4/1994 | Tanaka | F16H 61/061 |
| | | | | | 475/123 |
| 5,899,829 | A | * | 5/1999 | Salecker | B60W 10/02 |
| | | | | | 477/78 |
| 6,145,399 | A | * | 11/2000 | Bockmann | F16H 61/0213 |
| | | | | | 477/124 |
| 9,927,025 | B2 | * | 3/2018 | Song | F16H 61/18 |
| 2003/0045988 | A1 | * | 3/2003 | Suzuki | B60K 6/485 |
| | | | | | 701/54 |
| 2004/0084002 | A1 | * | 5/2004 | Mitsutani | F02D 41/021 |
| | | | | | 123/179.4 |

(Continued)

FOREIGN PATENT DOCUMENTS

JP 2000-205392 A 7/2000
JP 2001-336629 A 12/2001

(Continued)

*Primary Examiner* — Colby M Hansen
(74) *Attorney, Agent, or Firm* — Morgan, Lewis & Bockius LLP

(57) ABSTRACT

A method for automatically controlling a shift stage may include a shift stage check operation of detecting a position of the shift stage of a vehicle, a driving and stopping sensing operation, of detecting driving state information of the vehicle to determine whether the vehicle is in a driving or a stopping condition, a learning preparing operation, of identifying whether the shift stage is shifted from a D stage to an N stage when it is determined that the shift stage enters the stopping condition at the D stage, a learning operation, of measuring a shifting time from when the shift stage enters the stopping condition at the D stage to when the shift stage is shifted to the N stage, and a learning execution operation, of automatically shifting the shift stage from the D stage to the N stage in the stored shifting time.

12 Claims, 3 Drawing Sheets

(56) References Cited

U.S. PATENT DOCUMENTS

2005/0021208 A1* 1/2005 Nagai .................... F16H 61/20
701/54

FOREIGN PATENT DOCUMENTS

| JP | 2001-349424 A | 12/2001 |
|---|---|---|
| JP | 2004-225797 A | 8/2004 |
| KR | 10-2009-0111114 A | 10/2009 |
| KR | 10-1289211 B1 | 7/2013 |

* cited by examiner

METHOD AND SYSTEM FOR AUTOMATICALLY CONTROLLING SHIFT STAGE

CROSS REFERENCE TO RELATED APPLICATION

The present application claims priority to Korean Patent Application Number 10-2015-0063706 filed May 7, 2015, the entire contents of which is incorporated herein for all purposes by this reference.

BACKGROUND OF THE INVENTION

Field of the Invention

The present invention relates to a method and a system for automatically controlling a shift stage capable of improving fuel efficiency and convenience of a user by automatically shifting the shift stage from a Drive stage (D stage) to a Neutral stage (N stage) during a stop, in an electronic shift system.

Description of Related Art

In general, a transmission, which is an apparatus changing torque and speed so that power of an engine is suitable for a driving state of a vehicle and transferring the changed torque and speed to driving wheels, is classified into a manual transmission and an automatic transmission.

A driver driving a vehicle may change a shift stage of the manual transmission or the automatic transmission to a shift stage that he or she desires by operating a shift lever mounted on a console surface around a driver seat or a handle.

In the case of the manual transmission, when the driver selects a gear matched to the driving of the vehicle using the shift lever, the selected gear is transferred to the transmission through a cable, a rod, or the like such that the driving that the driver desires may be performed, and in the case of the automatic transmission, an inhibitor switch is driven through the cable by moving the shift lever by the driver, such that a motion that the driver desires is transferred to the transmission.

Particularly, the use of an electronic shift lever that electronically performs a shift operation by replacing a mechanical shift lever with an actuator and an electronic control device (ECU) that electronically operate a mechanical connection structure of the transmission and the shift lever has recently been increased. Unlike the mechanical shift lever, the electronic shift lever does not have a mechanical cable connection structure and should include a position sensor device that converts a shift intention of the driver into an electronic signal, but has advantages that operation force and operation feeling of the lever are excellent and the operation thereof is simple.

Since the above-mentioned electronic shift system (shift by wire) is not mechanically connected to the transmission by the rod and the cable, it has characteristics that may control a shift condition depending on a situation, and as a result, an automatic Park stage (P stage) engaging function for safety has been applied. However, in the electronic shift system which may be variously applied, other functions are not currently added, in addition to a function of performing an automatic engagement to a P stage when a start is in an off state or a start of an N stage is in the off state.

Therefore, various ways capable of improving fuel efficiency and further improving convenience of the driver using the electronic shift system are required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method and a system for automatically controlling a shift stage capable of improving convenience of a driver and fuel efficiency by learning a habit of the driver and automatically shifting the shift stage from a Drive stage (D stage) to an Neutral stage (N stage) based on the learned habit in the case in which the vehicle is stopped at the D stage, in an electronic shift system.

According to various aspects of the present invention, a method for automatically controlling a shift stage may include a shift stage check operation, by a shift stage sensing device, of detecting a position of the shift stage of a vehicle to check the shift stage, a driving and stopping sensing operation, by a driving and stopping sensing device, of detecting driving state information of the vehicle to determine whether the vehicle is in a driving or a stopping condition, a learning preparing operation, by a shift stage controlling device, of identifying whether the shift stage is shifted from a D stage to an N stage when it is determined that the shift stage enters the stopping condition at the D stage by the shift stage check operation and the driving and stopping sensing operation, a learning operation, by the shift stage controlling device, of measuring a shifting time from when the shift stage enters the stopping condition at the D stage to when the shift stage is shifted to the N stage when it is identified that the shift stage is shifted from the D stage to the N stage in the learning preparing operation and storing the corresponding shifting time, and a learning execution operation, by the a shift stage controlling device, of automatically shifting the shift stage from the D stage to the N stage in the stored shifting time when the shift stage again enters the stopping condition at the D stage after the learning operation.

In the driving and stopping sensing operation, when a brake is operated and driving speed of the vehicle is 0 km, it may be determined that the vehicle is in the stopping condition.

In the learning preparing operation, it may be identified whether the stage shift is shifted from the D stage to the N stage by reflecting an intention of a driver.

In the learning operation, the shifting time from a moment in which the shift stage enters the stopping condition at the D stage to when the shift stage is shifted from the D stage to the N stage by the intention of the driver may be measured as much as the number of setting times, and the respective shifting times may be collected and stored.

In the learning execution operation, when the shift stage again enters the stopping condition at the D stage, an automatic shift from the D stage to the N stage may be performed in a most measured time among the shifting times as much as the number of setting times.

In the learning execution operation, when the shift stage again enters the stopping condition at the D stage, an average time for the shifting times as much as the number of setting times is derived and an automatic shift from the D stage to the N stage may be performed in the derived average time.

The learning preparing operation may further include an automatic shift operation of automatically performing the shift from the D stage to the N stage when the shift stage is not shifted from the D stage to the N stage during a pre-stored setting time by not reflecting the intention of the driver, in a case in which the shift stage enters the stopping condition at the D stage.

In the learning operation, the shift time in which the shift stage is shifted from the D stage to the N stage by reflecting the intention of the driver and the setting time which is pre-stored so that the shift stage is automatically shifted from the D stage to the N stage may be compared with each other, and when the shifting time in which the shift stage is shifted from the D stage to the N stage by the intention of the driver is performed to be fast over the number of setting times as compared to the setting time, the setting time may be changed to the shifting time to which the intention of the driver is reflected and is stored.

According to various aspects of the present invention, a system for automatically controlling a shift stage may include a shift stage sensing device configured to detect a position of the shift stage of a vehicle to check the shift stage depending on a shift position signal of the shift stage, a driving and stopping sensing device configured to detect driving state information of the vehicle to determine whether the vehicle is in a driving condition or a stopping condition, and a shift stage controlling device configured to receive information on the shift stage and the driving and stopping conditions from the shift stage sensing device and the driving and stopping sensing device, measure and store a shifting time from when the shift stage enters the stopping condition at a D stage to when the shift stage is shifted to an N stage in the case in which the shift stage enters the stopping condition at the D stage, and automatically shift the shift stage from the D stage to the N stage in the stored shifting time in a case in which the shift stage again subsequently enters the stopping condition at the D stage.

The driving and stopping sensing device may be configured to determine that the vehicle is in the stopping condition in a case in which a brake is operated and driving speed of the vehicle is 0 km.

The shift stage controlling device may be configured to identify whether the shift stage is shifted from the D stage to the N state by reflecting an intention of a driver, and automatically perform a shift from the D stage to the N stage in a case in which the intention of the driver to shift the shift stage from the D stage to the N stage is not reflected during a pre-stored setting time.

The shift stage controlling device may be configured to compare the shift time in which the shift stage is shifted from the D stage to the N stage by reflecting the intention of the driver with the setting time which is pre-stored so that the shift stage is automatically shifted from the D stage to the N stage, and change and store the setting time to the shifting time to which the intention of the driver is reflected in a case in which the shifting time in which the shift stage is shifted from the D stage to the N stage by the intention of the driver is performed to be fast over the number of setting times as compared to the pre-stored setting time.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
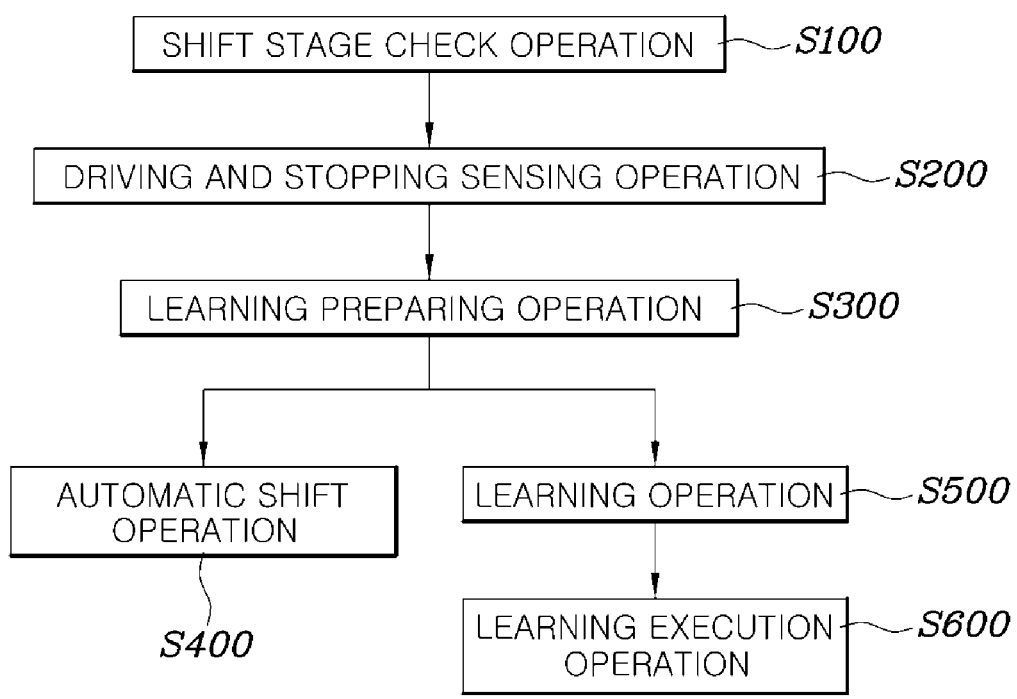
FIG. 1 and FIG. 2 are flow charts of an exemplary method for automatically controlling a shift stage according to the present invention.
Figure 2:
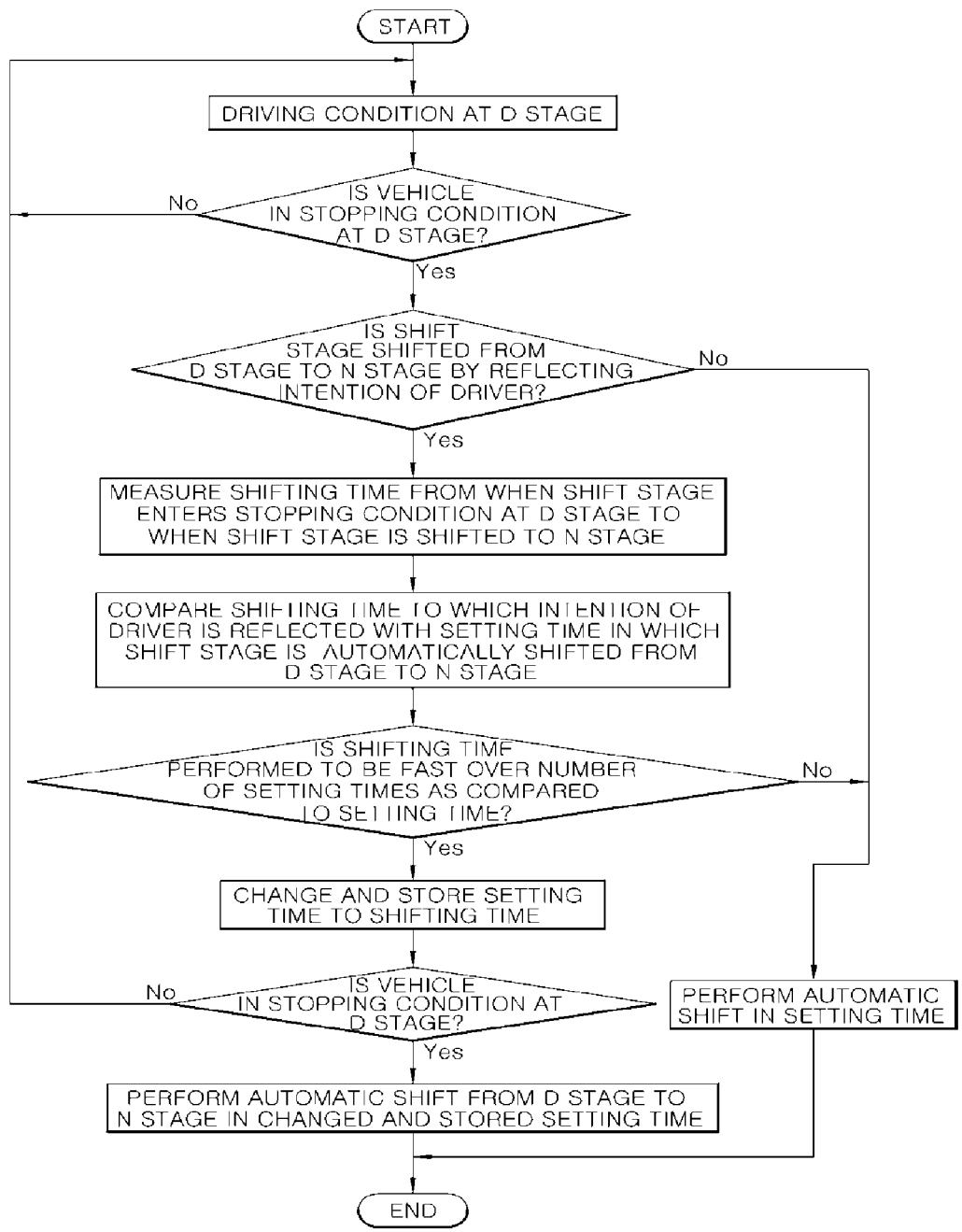
Figure 3:
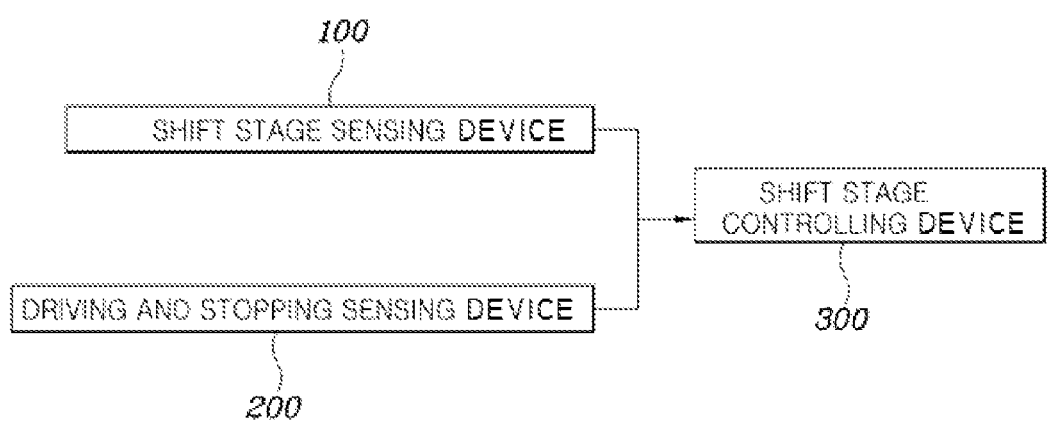
FIG. 3 is a configuration diagram of an exemplary system for automatically controlling a shift stage according to the present invention.

FIG. 1 and FIG. 2 are flow charts of a method for automatically controlling a shift stage according to various embodiments of the present invention and FIG. 3 is a configuration diagram of a system for automatically controlling a shift stage according to various embodiments of the present invention.

A method for automatically controlling a shift stage according to the present invention includes a shift stage check operation (S100) of detecting a position of the shift stage of a vehicle to check the shift stage, a driving and stopping sensing operation (S200) of detecting driving state information of the vehicle to determine whether the vehicle is in a driving or stopping condition, a learning preparing operation (S300) of identifying whether the shift stage is shifted from a Drive stage (D stage) to an Neutral stage (N stage) if it is determined that the shift stage enters the stopping condition at the D stage by the shift stage check operation (S100) and the driving and stopping sensing operation (S200), a learning operation (S500) of measuring a shifting time from when the shift stage enters the stopping condition at the D stage to when the shift stage is shifted to the N stage if it is identified that the shift stage is shifted from the D stage to the N stage in the learning preparing operation (S300) and storing the corresponding shifting time, and a learning execution operation (S600) of automatically shifting the shift stage from the D stage to the N stage in the stored shifting time if the shift stage again enters the stopping condition at the D stage after the learning operation (S500), as shown in FIG. 1 and FIG. 2.

According to the present invention, the shift stage is automatically shifted to the N stage when entering the stopping condition in a state in which the shift stage is maintained in the driving condition of the D stage as it is, thereby improving convenience of a user and also improving fuel efficiency. Particularly, the present invention is to perform an automatic shift by considering a shift habit of a driver when the shift stage is automatically shifted from the D stage to the N stage. If the shift stage enters the stopping condition at the D stage, the shifting time from when the shift stage enters the stopping condition to when the shift stage is shifted to the N stage is measured and stored, and if the shift stage again subsequently enters the stopping condition at the D stage, the automatic shift from the D stage to the N stage is performed in the stored shifting time based on the stored shifting time.

As such, by learning the shift habit of the driver and performing the automatic shift based on the learned shift habit of the driver, since the shift which is suitable for a tendency of the driver is implemented, convenience is improved, and at the same time, since the automatic shift to the N stage is performed when the shift stage enters the stopping condition at the D stage, fuel efficiency is secured.

The method for automatically controlling the shift stage according the present invention will be described in detail. In the shift stage check operation (S100), the position of the shift stage of the vehicle is detected to check the shift stage. This means that the driver directly operates a shift lever to change the position of the shift stage, and particularly, according to the present invention, the shift of the D stage and the N stage is checked.

In the driving and stopping sensing operation (S200), the driving state information of the vehicle is detected to determine whether the vehicle is in the driving or stopping condition. Particularly, in the driving and stopping sensing operation (S200), if a brake is operated to make driving speed of the vehicle 0 km, it is determined that the vehicle is in the stopping condition. In addition, in this operation, it may be further determined whether or not a road is a level without a slope.

Meanwhile, in the learning preparing operation (S300), if it is determined that the shift stage enters the stopping condition at the D stage by the shift stage check operation (S100) and the driving and stopping sensing operation (S200), it is identified whether the shift stage is shifted from the D stage to the N stage. Here, the shift habit of the driver after the shift stage enters the stopping condition at the D stage may be identified by checking whether the shift is performed by reflecting an intention of the driver when it is identified whether the shift stage is shifted from the D stage to the N stage.

According to the present invention, a time in which the shift stage is automatically shifted is set depending on the shift habit of the driver. In order to accurately identify the shift habit of the driver, in the learning operation (S500), the shifting time from the moment in which the shift stage enters the stopping condition at the D stage to when the shift stage is shifted from the D stage to the N stage by the intention of the driver is measured as much as the number of setting times, and the respective shifting times are collected and stored.

As such, the shift habit of the driver may be more accurately determined by measuring the shifting time shifted by the intention of the driver over many times as much as the number of setting times, and sense of difference does not occur when the automatic shift is subsequently performed based on the shift habit of the driver.

By the learning operation (S500) described above, the automatic shift is performed in a shift pattern in which a basic tendency of the driver is considered, by identifying the shift habit of the driver when the shift stage enters the stopping condition at the D stage and storing the shift habit of the driver.

Meanwhile, in the learning execution operation (S600), if the shift stage again enters the stopping condition at the D stage, the automatic shift from the D stage to the N stage is performed in the most measured time among the shifting times as much as the number of setting times. Alternatively, in the learning execution operation (S600), if the shift stage again enters the stopping condition at the D stage, an average time for the shifting times as much as the number of setting times may be derived and the automatic shift from the D stage to the N stage may be performed in the derived average time.

As one example, when it is assumed that the number of setting times is 10, if a shifting time of 2 seconds from the D stage to the N stage among the shifting times of t1, t2, t3, . . . , t10 is measured the most, the shift habit of the driver is detected that the driver shifts the shift stage from the D stage to the N stage in about two seconds when the shift stage enters the stopping condition at the D stage, and if the two seconds pass when the shift stage again subsequently enters the stopping condition at the D stage, the automatic shift from the D stage to the N stage is performed.

As another example, when it is assumed that the number of setting times is 10, if the average time for the shifting times is derived by collecting all of the shifting times of t1, t2, t3, . . . , t10 and the derived average time is two seconds, the shift habit of the driver is detected that the driver shifts the shift stage from the D stage to the N stage in about two seconds when the shift stage enters the stopping condition at the D stage, and if the two seconds pass when the shift stage again subsequently enters the stopping condition at the D stage, the automatic shift from the D stage to the N stage may be performed.

As such, when the shift stage enters the stopping condition at the D stage, the shift pattern is learned depending on the tendency of the driver and the automatic shift is performed depending on the shift pattern of the driver, thereby making it possible for the driver not to feel the sense of difference and to feel convenience for the automatic shift.

Meanwhile, the learning preparing operation (S300) may further include an automatic shift operation (S400) of automatically performing the shift from the D stage to the N stage when the shift stage is not shifted from the D stage to the N stage during a pre-stored setting time by not reflecting the intention of the driver, in the case in which the shift stage enters the stopping condition at the D stage.

That is, if the shift from the D stage to the N stage according to the intention of the driver is not performed in a state in which the shift stage enters the stopping condition at the D stage, it is determined whether the shift is not performed during the pre-stored setting time, and if the shift from the D stage to the N stage is not performed during the pre-stored setting time, the shift from the D stage to the N stage is automatically performed at a point of time in which the setting time arrives.

Here, the setting time, which is an initially set time, may be set by considering a general driving and stopping time. Particularly, since the present invention tries to improve fuel efficiency by performing the automatic shift from the D stage to the N stage, the automatic shift from the D stage to the N stage is performed in the case in which the driver does not perform the shift to the N stage during the setting time when the shift stage enters the stopping condition at the D stage.

In this case, a shift sound may be generated using the shift lever, or a warning light informing a cluster of the automatic shift may be flickered so that the driver may recognize that the shift stage is automatically shifted from the D stage to the N stage.

Meanwhile, as one example, in the learning operation (S500), the shift time in which the shift stage is shifted from the D stage to the N stage by reflecting the intention of the driver and the setting time which is pre-stored so that the shift stage is automatically shifted from the D stage to the N stage may be compared with each other, and if the shifting time in which the shift stage is shifted from the D stage to the N stage by the intention of the driver is performed to be fast over the number of setting times as compared to the setting time, the setting time may be changed to the shifting time to which the intention of the driver is reflected and may be stored.

That is, according to the present invention, the setting time in which the shift stage is automatically shifted from the D stage to the N stage is pre-stored, and a time in which the shift stage is automatically shifted in the shift pattern of the driver is updated by comparing the setting time with the shifting time in which the shift stage is shifted from the D stage to the N stage by reflecting the intention of the driver.

Specifically, when the setting time arrives after the shift stage enters the stopping condition at the D stage, the shift stage is automatically shifted from the D stage to the N stage. Here, in the case in which the shifting time taken as the shift stage is shifted from the D stage to the N stage by the intention of the driver is faster than the setting time, the setting time is changed to the shifting time to which the intention of the driver is reflected and is stored, such that the automatic shift is subsequently performed in the shift pattern of the driver.

However, in order to accurately detect the shift habit of the driver, if the shifting time in which the shift stage is shifted from the D stage to the N stage by the intention of the driver is measured during the number of setting times and the shift from the D stage to the N stage is performed to be faster than the setting time in a specific shifting time during the number of setting times, the setting time is changed to the corresponding shifting time, thereby clearly detecting the shift habit of the driver.

According to the method for automatically controlling the shift stage having the structure as described above, in the case in which the vehicle is stopped at the D stage, the shift habit of the driver is learned and the automatic shift from the D stage to the N stage is performed based on the learned shift habit of the driver. Particularly, since the automatic shift is performed based on the shift habit by considering the shift habit of the driver, convenience of the driver is improved, and since the shift stage is automatically shifted from the D stage to the N stage, fuel efficiency may be improved.

Meanwhile, the system for automatically controlling the shift stage according to the present invention includes a shift stage sensing device 100 detecting a position of the shift stage of a vehicle to check the shift stage depending on a shift position signal of the shift stage, a driving and stopping sensing device 200 detecting driving state information of the vehicle to determine whether the vehicle is in a driving condition or a stopping condition, and a shift stage controlling device 300 receiving information on the shift stage and the driving and stopping conditions from the shift stage sensing device 100 and the driving and stopping sensing device 200, measuring and storing a shifting time from when the shift stage enters the stopping condition at a D stage to when the shift stage is shifted to an N stage in the case in which the shift stage enters the stopping condition at the D stage, and automatically shifting the shift stage from the D stage to the N stage in the stored shifting time in the case in which the shift stage again subsequently enters the stopping condition at the D stage, as shown in FIG. 3.

The driving and stopping sensing device 200 may determine that the vehicle is in the stopping condition in the case in which a brake is operated and driving speed of the vehicle is 0 km.

Particularly, the shift stage controlling device 300 identifies whether the shift stage is shifted from the D stage to the N state by reflecting an intention of the driver, and automatically performs a shift from the D stage to the N stage in the case in which the intention of the driver to shift the shift stage from the D stage to the N stage is not reflected during a pre-stored setting time.

As such, in the state in which the shift stage enters the stopping condition at the D stage, if the setting time arrives, an automatic shift from the D stage to the N stage is performed, thereby making it possible to improve fuel efficiency. In this case, a shift sound may be generated using the shift lever, or a warning light informing a cluster of the automatic shift may be flickered so that the driver may recognize that the shift stage is automatically shifted from the D stage to the N stage.

Meanwhile, the shift stage controlling device 300 may compare the shifting time in which the shift stage is shifted from the D stage to the N stage by reflecting the intention of the driver with the setting time which is pre-stored so that the shift stage is automatically shifted from the D stage to the N stage, and may change and store the setting time to the shifting time to which the intention of the driver is reflected in the case in which the shifting time in which the shift stage is shifted from the D stage to the N stage by the intention of the driver is performed to be fast over the number of setting times as compared to the setting time. Thereby, the automatic shift may be performed in the shift habit of the driver by accurately detecting the shift habit of the driver.

According to the present invention described above, the shift stage is automatically shifted from the D stage to the N stage when entering the stopping condition in the state in which the shift stage is maintained in the driving condition of the D stage as it is, thereby improving convenience of the user and also improving fuel efficiency.

According to the method and the system for automatically controlling a shift stage having the structure as described above, in the electronic shift system, in the case in which the vehicle is stopped at the D stage, the shift habit of the driver may be learned and the shift stage may be automatically shifted from the D stage to the N stage based on the learned shift habit of the driver.

As such, since the automatic shift is performed based on the shift habit by considering the shift habit of the driver, convenience of the driver may be improved, and since the shift stage is automatically shifted to the N stage when the vehicle is stopped at the D stage, fuel efficiency may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A method for automatically controlling a shift stage, the method comprising:
    a shift stage check operation, by a shift stage sensing device, of detecting a position of the shift stage of a vehicle to check the shift stage;
    a driving and stopping sensing operation, by a driving and stopping sensing device, of detecting driving state information of the vehicle to determine whether the vehicle is in a driving or a stopping condition;
    a learning preparing operation, by a shift stage controlling device, of identifying whether the shift stage is shifted from a Drive stage (D stage) to an Neutral stage (N stage) when it is determined that the shift stage enters the stopping condition at the D stage by the shift stage check operation and the driving and stopping sensing operation;
    a learning operation, by the shift stage controlling device, of measuring a shifting time from when the shift stage enters the stopping condition at the D stage to when the shift stage is shifted to the N stage when it is identified that the shift stage is shifted from the D stage to the N stage in the learning preparing operation and storing the corresponding shifting time; and
    a learning execution operation, by the a shift stage controlling device, of automatically shifting the shift stage from the D stage to the N stage in the stored shifting time when the shift stage again enters the stopping condition at the D stage after the learning operation.

2. The method of claim 1, wherein in the driving and stopping sensing operation, when a brake is operated and driving speed of the vehicle is 0 km, it is determined that the vehicle is in the stopping condition.

3. The method of claim 1, wherein in the learning preparing operation, it is identified whether the stage shift is shifted from the D stage to the N stage by reflecting an intention of a driver.

4. The method of claim 3, wherein in the learning operation, the shifting time from a moment in which the shift stage enters the stopping condition at the D stage to when the shift stage is shifted from the D stage to the N stage by the intention of the driver is measured as much as the number of setting times, and the respective shifting times are collected and stored.

5. The method of claim 4, wherein in the learning execution operation, when the shift stage again enters the stopping condition at the D stage, an automatic shift from the D stage to the N stage is performed in a most measured time among the shifting times as much as the number of setting times.

6. The method of claim 4, wherein in the learning execution operation, when the shift stage again enters the stopping condition at the D stage, an average time for the shifting times as much as the number of setting times is derived and an automatic shift from the D stage to the N stage is performed in the derived average time.

7. The method of claim 3, wherein the learning preparing operation further includes an automatic shift operation of automatically performing the shift from the D stage to the N stage when the shift stage is not shifted from the D stage to the N stage during a pre-stored setting time by not reflecting the intention of the driver, in a case in which the shift stage enters the stopping condition at the D stage.

8. The method of claim 3, wherein in the learning operation, the shift time in which the shift stage is shifted from the D stage to the N stage by reflecting the intention of the driver and the setting time which is pre-stored so that the shift stage is automatically shifted from the D stage to the N stage are compared with each other, and when the shifting time in which the shift stage is shifted from the D stage to the N stage by the intention of the driver is performed to be fast over the number of setting times as compared to the setting time, the setting time is changed to the shifting time to which the intention of the driver is reflected and is stored.

9. A system for automatically controlling a shift stage, the system comprising:
    a shift stage sensing device configured to detect a position of the shift stage of a vehicle to check the shift stage depending on a shift position signal of the shift stage;
    a driving and stopping sensing device configured to detect driving state information of the vehicle to determine whether the vehicle is in a driving condition or a stopping condition; and
    a shift stage controlling device configured to receive information on the shift stage and the driving and stopping conditions from the shift stage sensing device and the driving and stopping sensing device, measure and store a shifting time from when the shift stage enters the stopping condition at a D stage to when the shift stage is shifted to an N stage in the case in which the shift stage enters the stopping condition at the D stage, and automatically shift the shift stage from the D stage to the N stage in the stored shifting time in a case in which the shift stage again subsequently enters the stopping condition at the D stage.

10. The system of claim 9, wherein the driving and stopping sensing device is configured to determine that the vehicle is in the stopping condition in a case in which a brake is operated and driving speed of the vehicle is 0 km.

11. The system of claim 9, wherein the shift stage controlling device is configured to identify whether the shift stage is shifted from the D stage to the N state by reflecting an intention of a driver, and automatically perform a shift from the D stage to the N stage in a case in which the intention of the driver to shift the shift stage from the D stage to the N stage is not reflected during a pre-stored setting time.

12. The system of claim 11, wherein the shift stage controlling device is configured to compare the shift time in which the shift stage is shifted from the D stage to the N stage by reflecting the intention of the driver with the setting time which is pre-stored so that the shift stage is automatically shifted from the D stage to the N stage, and change and store the setting time to the shifting time to which the intention of the driver is reflected in a case in which the shifting time in which the shift stage is shifted from the D stage to the N stage by the intention of the driver is performed to be fast over the number of setting times as compared to the pre-stored setting time.

* * * * *